United States Patent
Martin et al.

(10) Patent No.: US 11,542,605 B1
(45) Date of Patent: Jan. 3, 2023

(54) METAL-COATED REACTIVE POWDERS AND METHODS FOR MAKING THE SAME

(71) Applicant: HRL Laboratories, LLC, Malibu, CA (US)

(72) Inventors: John H. Martin, Oxnard, CA (US); Adam F. Gross, Santa Monica, CA (US)

(73) Assignee: HRL Laboratories, LLC, Malibu, CA (US)

( * ) Notice: Subject to any disclaimer, the term of this patent is extended or adjusted under 35 U.S.C. 154(b) by 0 days.

(21) Appl. No.: 16/842,883

(22) Filed: Apr. 8, 2020

Related U.S. Application Data

(62) Division of application No. 14/860,332, filed on Sep. 21, 2015, now Pat. No. 10,648,082.

(Continued)

(51) Int. Cl.
    *C23C 18/16*      (2006.01)
    *B32B 15/01*      (2006.01)
    *C23C 18/54*      (2006.01)

(52) U.S. Cl.
CPC .......... *C23C 18/1637* (2013.01); *B32B 15/01* (2013.01); *C23C 18/1644* (2013.01); *C23C 18/1689* (2013.01); *C23C 18/54* (2013.01)

(58) Field of Classification Search
CPC ... C23C 18/54; C23C 18/38; C23C 18/16–54; B22F 1/025
See application file for complete search history.

(56) References Cited

U.S. PATENT DOCUMENTS 3,920,410 A * 11/1975 Kunda ............... B22F 1/025
    428/570
5,064,463 A * 11/1991 Ciomek ............. B22F 1/025
    75/314

(Continued)

FOREIGN PATENT DOCUMENTS

| JP | 2011054892 A | 3/2011 |
| KR | 1020080105250 A | 12/2008 |
| WO | 2005017220 A1 | 2/2005 |

OTHER PUBLICATIONS

Lide, CRC Handbook of Chemistry and Physics (Year: 2006).*

(Continued)

*Primary Examiner* — Ho-Sung Chung
(74) *Attorney, Agent, or Firm* — O'Connor & Company; Ryan P. O'Connor

(57) ABSTRACT

The disclosed process is capable of depositing thin layers of a wide variety of metals onto powders of magnesium, aluminum, and their alloys. A material is provided that comprises particles containing a reactive metal coated with a noble metal that has a less-negative standard reduction potential than the reactive metal. The coating has a thickness from 1 nanometer to 100 microns, for example. A method of forming an immersion deposit on a reactive metal comprises: combining a reactive metal, an ionic liquid, and a noble metal salt; depositing the noble metal on the reactive metal by a surface-displacement reaction, thereby generating the immersion deposit on the reactive metal; and removing the ionic liquid from the immersion deposit. The material may be present in an article or object (e.g., a sintered part) containing from 0.25 wt % to 100 wt % of a coated reactive metal as disclosed herein.

19 Claims, 7 Drawing Sheets

Related U.S. Application Data

(60) Provisional application No. 62/053,207, filed on Sep. 21, 2014.

(56) References Cited

U.S. PATENT DOCUMENTS

| | | | |
|---|---|---|---|
| 5,305,726 | A | 4/1994 | Scharman et al. |
| 5,340,012 | A | 8/1994 | Beeferman et al. |
| 5,462,712 | A | 10/1995 | Langan et al. |
| 5,580,838 | A * | 12/1996 | Patterson ............... C25D 7/006 427/125 |
| 5,935,706 | A * | 8/1999 | Hoover ............... C23C 18/1644 428/375 |
| 6,024,915 | A | 2/2000 | Kume et al. |
| 6,071,628 | A | 6/2000 | Seals et al. |
| 6,254,757 | B1 | 7/2001 | Lashmore et al. |
| 6,319,608 | B1 * | 11/2001 | Dey ..................... C09K 3/1445 428/403 |
| 6,368,427 | B1 | 4/2002 | Sigworth |
| 9,238,877 | B2 | 1/2016 | Krause et al. |
| 2002/0136884 | A1 | 9/2002 | Oechsner |
| 2002/0182308 | A1 * | 12/2002 | Lee ........................ C23C 18/54 427/560 |
| 2003/0077473 | A1 | 4/2003 | Bretschneider et al. |
| 2003/0104147 | A1 | 6/2003 | Bretschneider et al. |
| 2005/0238528 | A1 | 10/2005 | Lin et al. |
| 2006/0065330 | A1 | 3/2006 | Cooper et al. |
| 2010/0288243 | A1 | 11/2010 | Kaburagi et al. |
| 2012/0135142 | A1 | 5/2012 | Yang et al. |
| 2012/0315399 | A1 | 12/2012 | Feng et al. |
| 2013/0012643 | A1 | 1/2013 | Monsheimer et al. |
| 2013/0146041 | A1 | 6/2013 | Hijii et al. |
| 2013/0152739 | A1 | 6/2013 | Li et al. |
| 2015/0203968 | A1 * | 7/2015 | Chang ..................... C23C 18/54 148/247 |
| 2015/0252451 | A1 | 9/2015 | Al-Aqeeli et al. |
| 2015/0322582 | A1 * | 11/2015 | Freydina .................. C25F 1/12 428/629 |
| 2015/0337423 | A1 | 11/2015 | Martin et al. |
| 2016/0047050 | A1 * | 2/2016 | Peng ................... C23C 18/1635 427/213.31 |
| 2016/0083860 | A1 * | 3/2016 | Monteiro ............... C25D 3/665 427/122 |
| 2017/0016095 | A1 | 1/2017 | Karlen et al. |
| 2017/0252851 | A1 | 9/2017 | Fulop et al. |

OTHER PUBLICATIONS

Chen et al., "Rapid control of phase growth by nanoparticles," Nature Communications 5:3879 DOI: 10.1038/ncomms4879.

Sheppard et al., "The Mechanochemical synthesis of magnesium hydride nanoparticles" Journal of Alloys and Compounds 492 (2010) L72-L74.

Zhu et al., "Growth Mechanism for the Controlled Synthesis of MgH2/Mg Crystals via a Vapor-Solid Process" Cryst. Growth Des. 2011, 11, 4166-4174.

Högberg et al., "Reactive sputtering of δ-ZrH2 thin films by high power impulse magnetron sputtering and direct current magnetron sputtering," Journal of Vacuum Science & Technology A 2014, 32, Apr. 15, 2010.

Gharatloo et al., "Ultrasound-assisted synthesis of nano-structured zirconium hydride at room temperature," International Journal of Hydrogen Energy 40 (2015) 13942-13948.

Mukherjee et al., "Printability of alloys for additive manufacturing" Scientific Reports | 6:19717 | DOI: 10.1038/srep19717, Jan. 22, 2016.

He et al., "Alloying element vaporization during laser spot welding of stainless steel" J. Phys. D: Appl. Phys. 36 (2003) 3079-3088.

Bartkowiak et al., "New Developments of Laser Processing Aluminium Alloys via Additive Manufacturing Technique" Physics Procedia 12 (2011) 393-401.

Zhang et al., "Grain Refinement and Mechanical Properties of Cu—Cr—Zr Alloys with Different Nano-Sized TiCp Addition" Materials 2017, 10, 919; doi:10.3390/ma10080919.

Roberts et al., "A novel processing approach for additive manufacturing of commercial aluminum alloys" Physics Procedia 83 ( 2016 ) 909-917.

Martin et al., "3D printing of high-strength aluminium alloys" Nature, vol. 549, Sep. 21, 2017.

* cited by examiner

METAL-COATED REACTIVE POWDERS AND METHODS FOR MAKING THE SAME

PRIORITY DATA

This patent application is a divisional application of U.S. patent application Ser. No. 14/860,332, filed on Sep. 21, 2015 (now allowed), which claims priority to U.S. Provisional Patent App. No. 62/053,207, filed on Sep. 21, 2014, each of which is hereby incorporated by reference herein.

FIELD OF THE INVENTION

The present invention generally relates to reactive metal powders, objects containing such metal powders, and methods of making and using the same.

BACKGROUND OF THE INVENTION

The ability to sinter certain materials at a low temperature is extremely important to reduce the processing cost and retain desired microstructures in the materials. Certain high-strength alloys of aluminum cannot be processed using conventional powder metallurgy techniques. This is due to a high sintering temperature which results in eutectic melting and/or peritectic decomposition of the alloy, forming a non-ideal two-phase structure. Furthermore, the self-passivating nature of aluminum and other alloys leads to oxides scales on powders if exposed to air, thus inhibiting sintering. Conventional powder processing techniques rely on mechanical force, e.g. pressing or extruding, to break up the oxide scale and enable consolidation.

Reactive metal powders include those which may react violently with moisture. Examples include, but are not limited to, aluminum, magnesium, and alloys thereof. One approach to protect these metals is to deposit another material or metal on the surface. A technique for depositing a second metal is immersion deposition. Aqueous methods for immersion deposition of other metals on these materials exist, but the metals are extremely reactive and these methods are unsuitable for mass powder production due to the large release of hydrogen gas and heat produced. In addition, commercial immersion-deposition materials are generally limited to zinc and tin. These are mainly used to prepare magnesium and aluminum alloys for electrodeposition and require significant dissolution of the surface in order to obtain a thin film. This dissolution is non-ideal and would evolve a great deal of hydrogen if used with powders. Other metals such as nickel and copper can be used in immersion deposition; however, these coatings have not been commercialized due to processing difficulties and low quality of the resulting deposits on reactive metals.

These processes do not sufficiently remove the oxide barrier that inhibits sintering and they require substantial pretreatment of the material prior to deposition, often using hazardous etchants such as hydrofluoric acid. See Zelley, "Formation of Immersion Zinc Coatings on Aluminum," *J. Electrochem. Soc.* 1953, volume 100, issue 7, pages 328-333.

There is also prior art that uses aqueous deposition to improve sintering of tungsten by creating surface eutectics. See Hayden and Brophy, "The Activated Sintering of Tungsten with Group VIII Elements," *J. Electrochem. Soc.* 1963, volume 110, issue 7, pages 805-810, which describes that very thin layers of a carefully selected metal can drastically improve sintering. This is an aqueous process requiring thermal decomposition of the deposited salts in order to form a coating. Note, however, that tungsten is stable in water while reactive metals form more oxide when undergoing aqueous immersion deposition.

U.S. Pat. No. 6,254,757 issued Jul. 4, 2001 for "Method for electrochemical fluidized bed coating of powders," employs a fluidized bed which maintains electrical contact between the particles and the cathode plate during cathodic electrochemical deposition of electrically activated powders. While this technique does coat the powders, it does not remove the underlying oxide barriers which will ultimately inhibit sintering of the powders.

Currently there are no known solution-based methods to deposit a variety of metals onto reactive metal powders. What is desired is a process capable of depositing thin layers of a wide variety of metals onto powders of magnesium, aluminum, and their alloys, among other metals. Safe, controllable, and convenient processes are highly desirable, such as anhydrous processes that do not require an electrical current for deposition and do not evolve hydrogen and heat. These processes should avoid intense thermal treatment for generating a final coating or sintered part.

SUMMARY OF THE INVENTION

The present invention addresses the aforementioned needs in the art, as will now be summarized and then further described in detail below.

Some variations provide a material comprising a plurality of particles containing a reactive metal coated with a coating comprising one or more noble metals, wherein at least one of the noble metals has a higher (i.e., less negative) standard reduction potential than the reactive metal, and wherein the coating has a thickness from about 1 nanometer to about 100 microns.

The particles may be in the form of a powder, such as a powder with average diameter between about 10 nanometers and about 1 centimeter. The powder particles may be characterized by an average aspect ratio from about 1:1 to about 100:1.

In some embodiments, the coating is an immersion deposit. The coating thickness may be about 1 micron or less, for example. The coating may be as thin as a single atomic layer.

The coating may include from 1 to 10 coating layers, wherein each of the coating layers has a thickness from about 1 nanometer to about 20 microns. In some embodiments, the coating includes multiple coating layers containing progressively more noble metals, i.e., noble metals that have increasing standard reduction potentials in the direction away from the reactive metal.

The reactive metal may be selected from the group consisting of alkali metals, alkaline earth metals, aluminum, silicon, titanium, zirconium, hafnium, zinc, and combinations or alloys thereof. In some embodiments, the reactive metal is selected from aluminum, magnesium, or an alloy containing greater than 50 at % of aluminum and/or magnesium. In certain embodiments, the reactive metal has a standard reduction potential less than the standard reduction potential of a standard hydrogen electrode.

The noble metals may be selected from the group consisting of aluminum, zirconium, titanium, zinc, nickel, cobalt copper, silver, gold, palladium, platinum, rhodium, titanium, molybdenum, uranium, niobium, tungsten, tin, lead, tantalum, chromium, iron, indium, rhenium, ruthenium, osmium, iridium, and combinations or alloys thereof.

Optionally, the coating further contains a salt, carbon, an organic additive, an inorganic additive, or a combination thereof.

Optionally, the noble metals may be surface-reacted with an element selected from the group consisting of hydrogen, oxygen, carbon, nitrogen, boron, and combinations thereof.

Other variations of the invention provide a method of forming an immersion deposit on a reactive metal, wherein the immersion deposit comprises one or more noble metals, the method comprising:

(a) obtaining a reactive metal, an ionic liquid, and one or more noble metal salts, wherein the one or more noble metal salts are in the form of a solid, a liquid, or a gas;

(b) combining the reactive metal, the ionic liquid, and the one or more noble metal salts to form a reaction mixture, wherein at least one of the noble metals has a higher standard reduction potential than the reactive metal;

(c) selecting effective reaction conditions to deposit the at least one of the noble metals on the reactive metal by a surface-displacement reaction, thereby generating the immersion deposit on the reactive metal; and (d) removing the ionic liquid from the immersion deposit.

The reaction mixture may be agitated (e.g., by mechanical means or with an inert gas) or non-agitated. In some embodiments, a reactive gas is bubbled through the reaction mixture, wherein the gas includes an element selected from the group consisting of hydrogen, oxygen, carbon, nitrogen, boron, and combinations thereof. The reaction mixture is maintained at a reaction temperature from about 0° C. to about 200° C., such as room temperature.

In some embodiments, one or more noble metal salts are dissolved in a solvent prior to step (b). The reactive metal may be added to the ionic liquid prior to addition of the noble metal salts to the reaction mixture. Alternatively, or additionally, the reactive metal may be added to the ionic liquid after the noble metal salts are added to the reaction mixture.

In step (c), the one or more noble metal salts may be present from about 5 ppm to about 50 wt % of the reaction mixture, including the reactive metal. The one or more noble metal salts may be present from about 10 ppm to about 75 wt % of the reaction mixture on a reactive-metal-free basis.

In certain embodiments, an oxide-removing ionic liquid is introduced to remove residual oxides from the reactive metal. When used, the oxide-removing ionic liquid may be the same as the ionic liquid from step (a), or it may be different from the ionic liquid from step (a).

Multiple noble-metal layers may be sequentially deposited onto the reactive metal, wherein the multiple noble-metal layers have increasing standard reduction potentials in the direction away from the reactive metal. The multiple noble-metal layers may be applied in a common ionic liquid or mixture of ionic liquids, with sequential addition of the one or more noble metal salts. Alternatively, the multiple noble-metal layers may be applied in different ionic liquids or mixtures of ionic liquids, with sequential addition of the one or more noble metal salts.

In step (d), removing the ionic liquid from the immersion deposit may be selected from the group consisting of filtering, decanting, washing, diluting, centrifuging, drying, and combinations thereof. In some embodiments, removing the ionic liquid is a sequential step conducted between depositing multiple noble-metal layers.

When an oxide-removing ionic liquid is introduced to remove residual oxides from the reactive metal, the oxide-removing ionic liquid may be later removed by a technique selected from the group consisting of filtering, decanting, washing, diluting, centrifuging, drying, and combinations thereof.

The immersion deposit obtained by these methods may be characterized by a thickness from about 1 nanometer to about 100 microns, for example.

The material may be present in an article or object. Some variations of the invention provide an article containing from about 0.25 wt % to 100 wt % of a coated reactive metal with a coating comprising one or more noble metals, wherein at least one of the noble metals has a higher standard reduction potential than the reactive metal, and wherein the coating has a thickness from about 1 nanometer to about 100 microns.

In some embodiments, the article contains about 95 wt % or more of the coated reactive metal. In other embodiments, the article contains about 0.25 wt % to about 95 wt % or more of the coated reactive metal. The article may contain multiple reactive metals, each coated with one or more noble metals. The coating in the article may contain multiple layers each containing one or more noble metals. The article may have a porosity from 0% to about 75%, in various embodiments.

The article may be selected from the group consisting of a sintered structure, a coating, a weld filler, a billet, a net-shape part, a near-net-shape part, and combinations thereof. The article may be produced from the coated reactive metal by a process comprising one or more techniques selected from the group consisting of hot pressing, cold pressing, sintering, extrusion, injection molding, additive manufacturing, electron-beam melting, selective laser sintering, pressureless sintering, and combinations thereof.

DETAILED DESCRIPTION OF EMBODIMENTS OF THE INVENTION

Figure 1A:
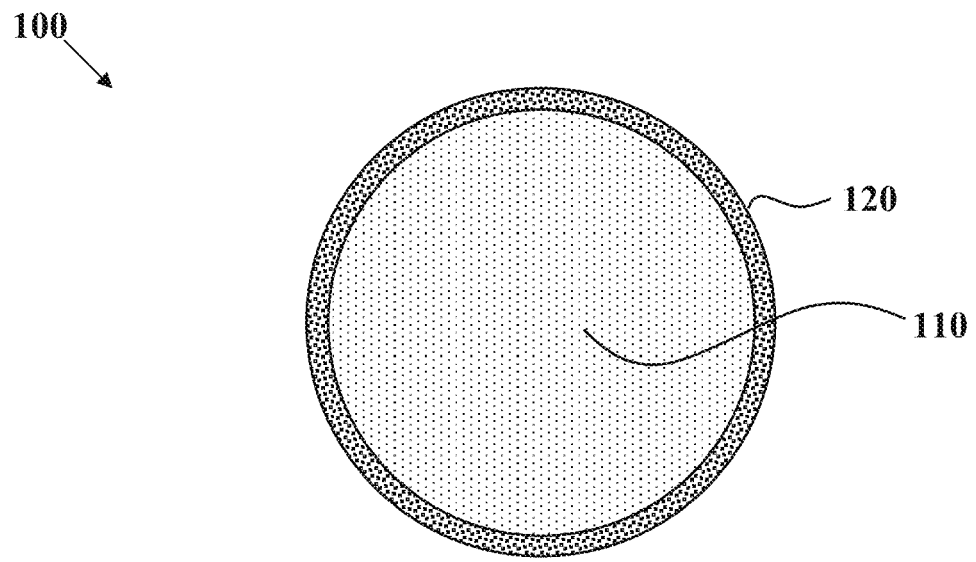
FIG. 1A shows a schematic representation of an exemplary single immersion-deposition layer coated on a reactive metal particle.

The structures, compositions, and methods of the present invention will be described in detail by reference to various non-limiting embodiments.

This description will enable one skilled in the art to make and use the invention, and it describes several embodiments, adaptations, variations, alternatives, and uses of the invention. These and other embodiments, features, and advantages of the present invention will become more apparent to those skilled in the art when taken with reference to the following detailed description of the invention in conjunction with the accompanying drawings.

As used in this specification and the appended claims, the singular forms "a," "an," and "the" include plural referents unless the context clearly indicates otherwise. Unless defined otherwise, all technical and scientific terms used herein have the same meaning as is commonly understood by one of ordinary skill in the art to which this invention belongs.

Unless otherwise indicated, all numbers expressing conditions, concentrations, dimensions, and so forth used in the specification and claims are to be understood as being modified in all instances by the term "about." Accordingly, unless indicated to the contrary, the numerical parameters set forth in the following specification and attached claims are approximations that may vary depending at least upon a specific analytical technique.

The term "comprising," which is synonymous with "including," "containing," or "characterized by" is inclusive or open-ended and does not exclude additional, unrecited elements or method steps. "Comprising" is a term of art used in claim language which means that the named claim elements are essential, but other claim elements may be added and still form a construct within the scope of the claim.

As used herein, the phrase "consisting of" excludes any element, step, or ingredient not specified in the claim. When the phrase "consists of" (or variations thereof) appears in a clause of the body of a claim, rather than immediately following the preamble, it limits only the element set forth in that clause; other elements are not excluded from the claim as a whole. As used herein, the phrase "consisting essentially of" limits the scope of a claim to the specified elements or method steps, plus those that do not materially affect the basis and novel characteristic(s) of the claimed subject matter.

With respect to the terms "comprising," "consisting of," and "consisting essentially of," where one of these three terms is used herein, the presently disclosed and claimed subject matter may include the use of either of the other two terms. Thus in some embodiments not otherwise explicitly recited, any instance of "comprising" may be replaced by "consisting of" or, alternatively, by "consisting essentially of."

Variations of the present invention provide a reactive metal coated with a more noble metal, a method for making such a structure, and an article which may be manufactured from the coated metal. The principles of this invention may be applied to a wide variety of potential metal immersion deposits on the surface of reactive metal powders, for a variety of applications including, but not limited to, powder metallurgy. Reactive metal powders have a variety of commercial applications.

Coating metal powders with a more noble metal can improve their environmental stability. Also, the ability of the metal powders to be sintered is improved, due to the removal of oxide barriers, in some embodiments described herein. The coating can also alter the surface morphology to control reaction kinetics and/or activity.

These coatings are preferably applied using immersion deposition in an ionic liquid, depositing a more-noble metal on a substrate of a less noble, more electronegative metal by chemical replacement from a solution of a metallic salt of the coating metal. This method requires no external electric field or additional reducing agent, as with standard electroplating or electroless deposition, respectively.

As used herein, an "ionic liquid" herein refers to any salt mixture which forms a non-aqueous liquid at a temperature lower than about 250° C. (i.e., the melting point of the salt mixture is lower than about 250° C.). In various embodiments, an ionic liquid includes a salt mixture with a melting point about, or below about, 200° C., 175° C., 150° C., 125° C., 100° C., 75° C., 50° C., or 25° C. An ionic liquid may include impurities such as water, superfluous cations or anions, or other species.

By using an ionic liquid, a solution-based method is provided to deposit a variety of metals onto reactive metal powders. The anhydrous method does not require an electrical current or thermal decomposition for deposition and does not evolve hydrogen and heat.

This invention is capable of producing a highly reactive powder with a more-noble immersion coating. Heretofore, methods of deposition are highly reactive, which can substantially alter the composition and structure of the underlying powder. The process disclosed herein preferably utilizes an ionic liquid to develop the immersion deposit, without the presence of moisture. This produces a uniform immersion deposit with very little change to the underlying particle.

If the reactive metal particle has no oxide layer, the immersion deposition can proceed quickly. If an oxide shell exists—as is the case with most reactive metal powders—the ionic liquid can dissolve the oxide layer with little damage to the underlying particle, thereby allowing an immersion deposition to occur. A reactive metal powder can be produced with a less-reactive shell capable of being handled in air. Depending on the immersion deposit, the particle could be sintered without impedance arising from the oxide shell. This feature can lower the required sintering temperature and sintering time, as well as reduce total oxide content and increase the mechanical toughness of the final sintered product. Reduced oxide content is beneficial when sintering aluminum alloy powders, which otherwise require elevated temperatures to sinter due to the robust oxide shell. The high temperature normally limits the number of possible alloys which can be sintered due to eutectic and/or peritectic decomposition that occurs in many high-strength aluminum alloys above a certain temperature. By enabling lower sintering temperatures, variations of this invention minimize eutectic and/or peritectic decomposition and allow a greater number of possible alloys to be fabricated.

In addition, the immersion deposit can alter the reflectivity of the particles. This property is particularly important when related to additive manufacturing of aluminum alloys. Laser-based processing techniques must compensate for the high reflectivity of the aluminum powder, and in many cases this cannot be overcome. Some embodiments provide a powder with lower reflectivity to absorb beam energy with greater efficacy and predictability.

The principles of the invention are applicable to reactive metal structures, such as magnesium and aluminum alloys. Certain pretreatment steps for the electrodeposition of these materials may be displaced by methods disclosed herein. These methods eliminate the need for aqueous processing which could otherwise contaminate certain ionic liquid or solvent-based plating solutions.

Generally speaking, this invention enables sintering of high-strength aluminum alloys using a variety of powder metallurgy processing techniques. By removing the oxide barrier, sintering can occur faster and at lower temperatures. This enables net-shape and near-net shape part production of high-strength aluminum components. In addition to aluminum alloys, processes set forth herein may be utilized on many other metals or alloys (reactive and non-reactive). Other commercial applications may include powder metallurgy of other reactive metals (e.g., magnesium); sintering aids for high-temperature metals (e.g., tungsten, molybdenum, etc.); battery and fuel cell electrodes; catalyst materials; and lightweight fillers.

Some variations provide a material comprising a plurality of particles containing a reactive metal coated with a coating comprising one or more noble metals, wherein at least one of the noble metals has a higher (i.e., less negative) standard reduction potential than the reactive metal, and wherein the coating has a thickness from about 1 nanometer to about 100 microns.

As used herein, a "reactive metal" may refer to any metal considered substantially unstable in water. In some embodiments, a reactive metal is one that readily oxidizes in moisture. Not wishing to be bound by theory, a reactive metal may refer to a metal which has a reduction potential more negative than that of a standard hydrogen electrode.

A "particle" or "powder" refers to a particle or plurality of particles, respectively, of a reactive metal. The particles may be in the form of a powder, such as a powder with average diameter between about 10 nanometers and about 1 centimeter. Particles may be solid, hollow, or a combination thereof. Particles can be made by any means including, for example, milling, cryomilling, wire explosion, laser ablation, electrical-discharge machining, or other techniques known in the art.

The powder particles may be characterized by an average aspect ratio from about 1:1 to about 100:1. The "aspect ratio" means the ratio of particle length to width, expressed as length:width. A perfect sphere has an aspect ratio of 1:1. For a particle of arbitrary geometry, the length is taken to be the maximum effective diameter and the width is taken to be the minimum effective diameter.

In some embodiments, the particles are in the shape of rods. By "rod" it is meant a rod-shaped particle or domain shaped like long sticks, dowels, or needles. The average diameter of the rods may be selected from about 5 nanometers to about 100 microns, for example. Rods need not be perfect cylinders, i.e. the axis is not necessarily straight and the diameter is not necessarily a perfect circle. In the case of geometrically imperfect cylinders (i.e. not exactly a straight axis or a round diameter), the aspect ratio is the actual axial length, along its line of curvature, divided by the effective diameter, which is the diameter of a circle having the same area as the average cross-sectional area of the actual nanorod shape.

A "coating" or "deposit" refers to one or more layers of one or more noble metals on a reactive metal. A coating may be between 1 nanometer and 100 microns, for example, such as about 1 micron or less. It is possible for a coating to be a single atomic layer deposit. A coating may completely cover the reactive metal or may partially cover the surface.

A "layer" refers to a single noble-metal immersion layer that is deposited onto a less-noble metal. Thicknesses of layers may be between 1 nanometer and 20 microns, for example. It is possible for a layer to be a single atomic layer deposit.

A coating may include from 1 to 10 coating layers, wherein each of the coating layers has a thickness from about 1 nanometer to about 20 microns. When there are multiple coating layers present, the individual layers differ in some chemical or physical way. The coating layers may be distinguishable chemically, i.e., varying chemical composition. In some embodiments, the coating includes multiple coating layers containing progressively more noble metals, i.e., noble metals that have increasing standard reduction potentials in the direction away from the reactive metal. The coating layers may be distinguishable physically, such as different densities or surface area.

In this disclosure, "noble" or "noble metal" refers to a metal whose standard reduction potential is higher (i.e., more positive) than a material onto which the noble metal is deposited. A "more noble metal" refers to a metal whose standard reduction potential is higher (i.e., more positive) than a metal onto which the noble metal is deposited. Note that in this disclosure, noble metals are not limited to metals that are resistant to corrosion and oxidation in moist air.

In some embodiments, a noble metal is selected based on a relative degree of activity within a galvanic series. A galvanic series is a hierarchy of metals (or other electrically conductive materials, including composites and semimetals) of increasing activity. It should be noted, however, that in some cases a metal has a higher standard reduction potential than another metal, but is more active according to a galvanic series. This is because galvanic activity depends on environmental conditions and other species present in solution. Depending on the ionic liquid and activity of the metals in it, some metals may be more or less active, providing possibilities for certain layer combinations and hierarchies beyond what would be predicted by the standard galvanic series.

For clarity, "higher standard reduction potential" means less negative standard reduction potential, when both the reactive metal and the noble metal(s) have negative standard reduction potentials. In certain embodiments, the noble metal may have a positive standard reduction potential while the reactive metal has a negative standard reduction potential. To illustrate, a standard reduction potential of −2.0 V is higher than −3.0 V, and a standard reduction potential of +1.0 V is higher than −2.0 V.

In some embodiments, the values of standard electrode potentials are relative to the standard hydrogen electrode and are for the following conditions: temperature of 25° C.; effective concentration of 1 mol/L for each aqueous species; partial pressure of 101.325 kPa (absolute) for each gaseous reagent; and activity of unity for each pure solid, pure liquid, or water. The standard hydrogen electrode in this case is only as a reference to compare between reactive metal and noble metal, noting that typically there is not any actual hydrogen evolution in the methods herein. In some embodiments, the reactive metal which is being coated onto is used as a reference electrode.

A "noble metal salt" refers to the salt of the aforementioned noble metal where the noble metal may be in an oxidized state and present as a cation. A noble metal salt may be a solid, a liquid, a gas or a solid, liquid, or gas dissolved in a solvent. That is, for convenience of nomenclature, a "noble metal salt solution" is used interchangeably with "noble metal salt." For example, a noble metal salt may consist of a solid metal electrolytically dissolved into an ionic liquid, to obtain a dissolved salt from the solid metal.

The noble metals may be selected from the group consisting of aluminum, zirconium, titanium, zinc, nickel, cobalt copper, silver, gold, palladium, platinum, rhodium, titanium, molybdenum, uranium, niobium, tungsten, tin, lead, tantalum, chromium, iron, indium, rhenium, ruthenium, osmium, iridium, and combinations or alloys thereof. Exemplary noble metal alloys include steel, stainless steel 304, stainless steel 316, silicon bronze, monel 400, phosphor bronze, brass, admiralty brass, cupronickel, red brass, and so on.

In some cases, certain additives (organic ligands, salts, inorganic ligands, etc.) may be employed which alter a particular metal's reduction potential from the calculated standard. In this case, the particular metal is still considered noble to the metal it is deposited onto, regardless of the nobility (reduction potential) of the mixture containing the particular metal and additives.

Organic ligands may be reacted onto a noble metal, in some embodiments. Organic ligands may be selected from the group consisting of aldehydes, alkanes, alkenes, silicones, polyols, poly(acrylic acid), poly(quaternary ammonium salts), poly(alkyl amines), poly(alkyl carboxylic acids) including copolymers of maleic anhydride or itaconic acid, poly(ethylene imine), poly(propylene imine), poly(vinylimidazoline), poly(trialkylvinyl benzyl ammonium salt), poly(carboxymethylcellulose), poly(D- or L-lysine), poly(L-glutamic acid), poly(L-aspartic acid), poly(glutamic acid), heparin, dextran sulfate, L-carrageenan, pentosan polysulfate, mannan sulfate, chondroitin sulfate, and combinations or derivatives thereof.

The reactive metal may be selected from the group consisting of alkali metals, alkaline earth metals, aluminum, silicon, titanium, zirconium, hafnium, zinc, and combinations or alloys thereof. In some embodiments, the reactive metal is selected from aluminum, magnesium, or an alloy containing greater than 50 at % of aluminum and/or magnesium. In certain embodiments, the reactive metal has a standard reduction potential less than the standard reduction potential of a standard hydrogen electrode.

In some embodiments, some of the reactive metal may be initially present as a metal oxide (the metal oxide typically being present at the surface of reactive-metal particles). When this is the case, as described below, an ionic liquid may be utilized to remove residual oxides from the reactive metals. Other means of removing oxides from reactive metals may be employed, such as (but not limited to) carbothermic reactions, in some embodiments.

In some embodiments, the coating may be characterized as an immersion deposit. An "immersion deposit", "immersion deposition," "immersion deposition layer," and the like refer to the deposition of a more noble metal on a substrate of a less noble, more electronegative metal by chemical replacement from a solution of a metallic salt of the coating metal. Immersion deposition requires no external electric field or reducing agent, although either one of these could be present in some embodiments.

Some embodiments of the invention provide a reactive metal powder with a coating of one or more pure metal layers of noble metals. Multiple layers may be sequentially more noble layers, to create a layered coating. In some embodiments, each layer is of one metal and not an alloy. In some cases, diffusion of a layer into the bulk powder may occur due to thermodynamic and/or kinetic effects, making resolution of a layer difficult. Some ideal structures are represented in FIGS. 1A and 1B.

Figure 1B:
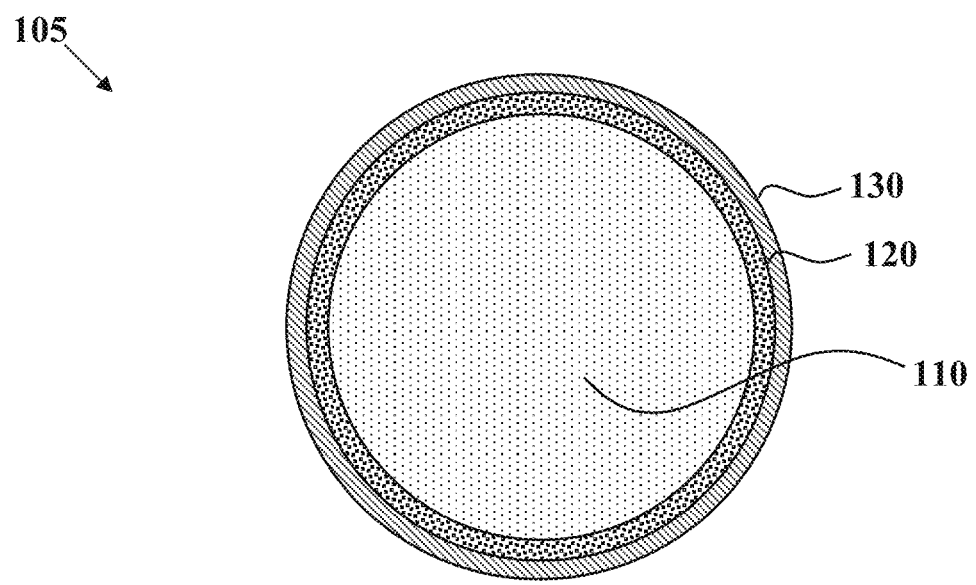
FIG. 1B shows a schematic representation of exemplary multiple immersion-deposition layers coated on a reactive metal particle.

FIG. 1A shows a schematic representation 100 of a single immersion-deposition layer 120 coated on a reactive metal particle 110. FIG. 1B shows a schematic representation 105 of multiple immersion-deposition layers 120, 130 coated on a reactive metal particle 110. In FIG. 1B, two immersion deposits (120, 130) are indicated, recognizing that additional layers may by present in other embodiments. In some embodiments, the coating 120 or 130 is a partial, rather than complete, coating. These structures (100, 105) are preferably devoid of an oxide layer between the immersion deposit 120 and the powder 110.

In general, the coating may be continuous or discontinuous. The coating 120 may have several characteristic features. In one embodiment, the coating 120 may be smooth and conformal to the underlying surface 110. In another embodiment, the coating 120 may be nodular. The nodular growth is characteristic of kinetic limitations of nucleation and growth. For example, the coating 120 may look like cauliflower or a small fractal growing from the surface 110. These features can be affected by the underling materials, the bath composition (for creating the immersion deposit), reaction conditions, etc.

The amount of material in the reactive-metal particles, compared to the amount of material in the immersion coatings, may vary widely depending on the particle sizes, the desired thickness of coating, and the desired surface coverage (i.e. continuous or discontinuous). In various embodiments, the weight ratio of the immersion deposit (all layers combined) to the total weight of the particle is from about 0.001 to about 1, such as about 0.005, 0.01, 0.05, 0.1, 0.2, 0.3, 0.4, or 0.5, for example.

Not wishing to be bound by theory, in cases where the oxide is not fully removed before deposition, growth will initiate at oxide-free areas to create nodular growth. In cases where the underling material is a multiphase material, the immersion deposit may only grow on one of the two (or more) phases, or may grow kinetically faster at such phases. In some cases, the galvanic interaction between different phases may accelerate the deposition.

The particles may further contain a metallic or non-metallic additive present in the reactive metal, in the noble metal, or in another region or phase. In certain embodiments, the reactive metal particle contains a core region that could be a non-metal (e.g., ceramic or carbon) coated with a shell that is the reactive metal. In this case, the shell metal needs to be less noble than the noble metal coating, while the core material is not limited to any particular nobility.

Some variations provide a particle with multiple layers and one outer layer containing or consisting of a noble metal, where intermediate layers may include other materials (i.e. not restricted to noble metals or even metals).

The particles may be anisotropic. As meant herein, "anisotropic" particles have at least one chemical or physical property that is directionally dependent. When measured along different axes, an anisotropic particle will have some variation in a measurable property. The property may be physical (e.g., geometrical) or chemical in nature, or both. The property that varies along multiple axes may simply be the presence of mass; for example, a perfect sphere would be geometrically isotropic while a cylinder is geometrically anisotropic. The amount of variation of a chemical or physical property may be 5%, 10%, 20%, 30%, 40%, 50%, 75%, 100% or more.

Optionally, the coating further contains a salt, carbon, an organic additive, an inorganic additive, or a combination thereof. These additives could be introduced to modify the standard reduction potential or for other purposes, which may or may not affect the standard reduction potential or the relative rank of nobility with the underlying reactive metal or an intermediate noble-metal layer.

Also, in some embodiments, the noble metals may be surface-reacted with an element selected from the group consisting of hydrogen, oxygen, carbon, nitrogen, boron, and combinations thereof. For example, reaction with hydrogen gas may be carried out to form a metal hydride from the noble metal in the immersion deposit. Such reactions with hydrogen, oxygen, carbon, nitrogen, boron, or other elements could be integrated with the immersion deposition itself, or could be a post-processing treatment following formation of the immersion deposit.

Other variations of the invention provide a method of forming an immersion deposit on a reactive metal, wherein the immersion deposit comprises one or more noble metals, the method comprising:

(a) obtaining a reactive metal, an ionic liquid, and one or more noble metal salts, wherein the one or more noble metal salts are in the form of a solid, a liquid, or a gas;

(b) combining the reactive metal, the ionic liquid, and the one or more noble metal salts to form a reaction mixture, wherein at least one of the noble metals has a higher standard reduction potential than the reactive metal;

(c) selecting effective reaction conditions to deposit the at least one of the noble metals on the reactive metal by a surface-displacement reaction, thereby generating the immersion deposit on the reactive metal; and (d) removing the ionic liquid from the immersion deposit.

A wide variety of ionic liquids may be employed. In some embodiments, the ionic liquid is a 2:1 molar ratio of aluminum chloride and 1-ethyl-3-methylimidazolium chloride. Other suitable ionic liquids include, but are not limited to, N-alkylpyridinium halides, N-alkylimidazolium halides, N,N'-alkylimidazolium halides, N-alkylpyrazolium halides, and N,N'-alkylpyrazolium halides. The halides in these organic salts may be replaced with different anions. Exemplary anions include bis(trifluoromethylsulfonyl) amide, tris(pentafluoroethyl)trifluorophosphate, trifluoroacetate, trifluoromethylsulfonate, dicyanoamide, tricyanomethide, tetracyanoborate, tetraphenylborate, tris(trifluoromethylsulfonyl)methide, and thiocyanate. These salts may be used alone or combined in any ratio or mixture with each other and/or an aluminum halide and/or another metal halide, to form an ionic liquid. The ionic liquid may include any concentration of the aforementioned chemicals, regardless of potential dissolution in one or more solvents. For instance, a <1 vol % imidazolium-based ionic liquid diluted with >99 vol % solvent is still referred to herein as an ionic liquid.

A "solvent" refers to a liquid which can suspend particles and/or is miscible with the ionic liquid. In some embodiments, the solvent is unreactive to both the powder and the ionic liquid and has greater than 10%, 25%, 50%, or 75% miscibility in the ionic liquid, preferably 100% miscibility. In other embodiments, the solvent is reactive to the ionic liquid and/or to the powder. For example, a solvent such as toluene may react with an ionic liquid (e.g., 1-ethyl-3-methylimmidazolium chloride:$AlCl_3$) to alter the solution ionic conductivity. A solvent such as dichloromethane may react with a powder such as aluminum to aid in the dissolution of the oxide. A solvent may be reactive to the ionic liquid and/or to the reactive metal powder prior to coating, but be unreactive to the coated powders. For instance, water may substantially react with both the reactive powder and the ionic liquid but still be used to rinse the particles after coating, with little to no reactivity with the coated powders. Solvents may be used in dilution, rinsing, cleaning, or combinations thereof.

The reaction mixture may be agitated (e.g., by mechanical means or with an inert gas) or non-agitated. In some embodiments, a reactive gas is bubbled through the reaction mixture, wherein the gas includes an element selected from the group consisting of hydrogen, oxygen, carbon, nitrogen, boron, and combinations thereof. The reaction mixture is maintained at a reaction temperature from about 0° C. to about 250° C., such as room temperature.

In some embodiments, one or more noble metal salts are dissolved in a solvent prior to step (b). The reactive metal may be added to the ionic liquid prior to addition of the noble metal salts to the reaction mixture. Alternatively, or additionally, the reactive metal may be added to the ionic liquid after the noble metal salts are added to the reaction mixture.

In step (c), the one or more noble metal salts may be present from about 5 ppm to about 50 wt % of the overall reaction mixture, including the reactive metal. On a reactive-metal-free basis, the one or more noble metal salts may be present from about 10 ppm to about 75 wt % of the reaction mixture, for example.

In certain embodiments, an oxide-removing ionic liquid is introduced to remove residual oxides from the reactive metal. When used, the oxide-removing ionic liquid may be the same as the ionic liquid from step (a), or it may be different from the ionic liquid from step (a).

Multiple noble-metal layers may be sequentially deposited onto the reactive metal, wherein the multiple noble-metal layers have increasing standard reduction potentials in the direction away from the reactive metal. The multiple noble-metal layers may be applied in a common ionic liquid or mixture of ionic liquids, with sequential addition of the one or more noble metal salts. Alternatively, the multiple noble-metal layers may be applied in different ionic liquids or mixtures of ionic liquids, with sequential addition of the one or more noble metal salts.

In step (d), removing the ionic liquid from the immersion deposit may be achieved using a technique selected from the group consisting of filtering, decanting, washing, diluting, centrifuging, drying, and combinations thereof. In some embodiments, removing the ionic liquid is a sequential step conducted between depositing multiple noble-metal layers.

When an oxide-removing ionic liquid is introduced to remove residual oxides from the reactive metal, the oxide-removing ionic liquid may be later removed by a technique selected from the group consisting of filtering, decanting, washing, diluting, centrifuging, drying, and combinations thereof.

Some variations of the invention provide methods to create an immersion deposit on a reactive metal powder. The basic principle is to combine a plurality of particles and an ionic liquid containing a noble metal salt, allowing an immersion deposit to form. An immersion deposit forms when a less-noble metal oxidizes at the surface and dissolves in the ionic liquid to allow reduction of a more-noble metal salt (originating from the ionic liquid), which chemically replaces some of the less-noble metal with the more-noble metal salt on the surface.

The thickness of the immersion deposit may be as large as about 200 microns, although typically the thickness will be about 20 microns or less. The immersion deposit can be induced to growth thicker, depending on the surface state of the less-noble metal. For instance, porosity and surface roughness can create diffusion boundaries which allow oxidation of the reactive metal in recessed areas but induce reduction elsewhere on the reactive metal. As long as the reactive metal is still exposed to the solution, reduction can continue to occur. Another technique to control deposition rate and thickness is to affect the kinetics of the deposition, by adjusting agitation (mass transfer), temperature, and salt concentration in solution, for example.

Altering the reaction temperature will have two effects on the reaction. First, increasing temperature will result in faster reaction rates due to reducing the effect of activation barriers and increasing the dissolution rate of an oxide shell.

Second, altering temperature will alter the reduction potentials of the reactive metal and more noble metal. If the difference in reduction potentials between the reactive metal and more noble metal is increased, then the reaction will become more thermodynamically favorable and will be more likely to occur. Changes in reduction potentials of metals with temperature are tabulated in Wardman, "Reduction Potentials of One-Electron Couples Involving Free Radicals in Aqueous Solution," *J. Phys. Chem. Ref. Data*, 1989, 18, 4, which is hereby incorporated by reference.

The noble metal salt may be used in very low concentrations and still produce a deposit. A possible range of noble metal salt concentrations may be between about 10 ppm and about 65 wt % on a reactive-metal-free basis. The lower end of the range is applicable for metals with large differences in standard reduction potential. The upper end of the range may be useful when the ionic liquid is actually formed from a more-noble metal that is intended to form the immersion deposit. An example is the chloroaluminate system to coat a magnesium particle with aluminum. A chloroaluminate ionic liquid may have an extremely high salt concentration (e.g., 50-75 wt %), to form an aluminum immersion deposit on Mg.

It is also possible to affect the structure and/or quality of the deposited material with additives. These additives may include, but are not limited to, catalytic metals and metal salts, organic molecules, and solvents.

The reactive metal powders may have an oxide shell which prevents immediate immersion deposition on the surface. Ionic liquids have the advantage of having high solubility of oxides, particularly those ionic liquids which are high in halide content. In the case of aluminum with an oxide barrier and a chloroaluminate ionic liquid, a soluble aluminum oxychloride complex is formed which exposes the pure aluminum to allow immersion deposition to proceed. This reaction can be accelerated when the ionic liquid contains dissolved HCl, which may be present from moisture contamination, or deliberately added.

Noble metal salts may be added to the ionic liquid prior to addition of the powders or after the oxide shell has been dissolved. In some cases, the noble metal salts may be added through electrolytic dissolution of an anode. When multiple layers are desired, salts may be added in a stepwise fashion after a previous layer is deposited. It may be beneficial to use a new or different ionic liquid between layers. The powders may be removed and placed in a new ionic liquid. If the immersion deposit is sufficiently stable, it is also possible for further layers to be deposited using other techniques including, but not limited to, electroless deposition, electrolytic deposition, and aqueous immersion deposition. After the coating is of a sufficient composition and thickness, the powders may be separated and cleaned of ionic liquid. This procedure could take many forms including, but not limited to, filtration and rinsing, centrifuge and decanting, and/or destruction of the ionic liquid.

An example of an immersion deposition displacement reaction is as follows:

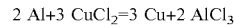

This reaction occurs spontaneously in solution at the surface of aluminum when in contact with a copper chloride solution. While this reaction is always thermodynamically favorable, aqueous solutions of copper chlorides also have to contend with the more favorable oxidizing reaction of aluminum and water, which produces aluminum oxide. By eliminating all other highly favorable reactions through eliminating their reactants in the immersion deposition bath, the immersion deposition reaction becomes the dominant redox reaction.

Figure 2:
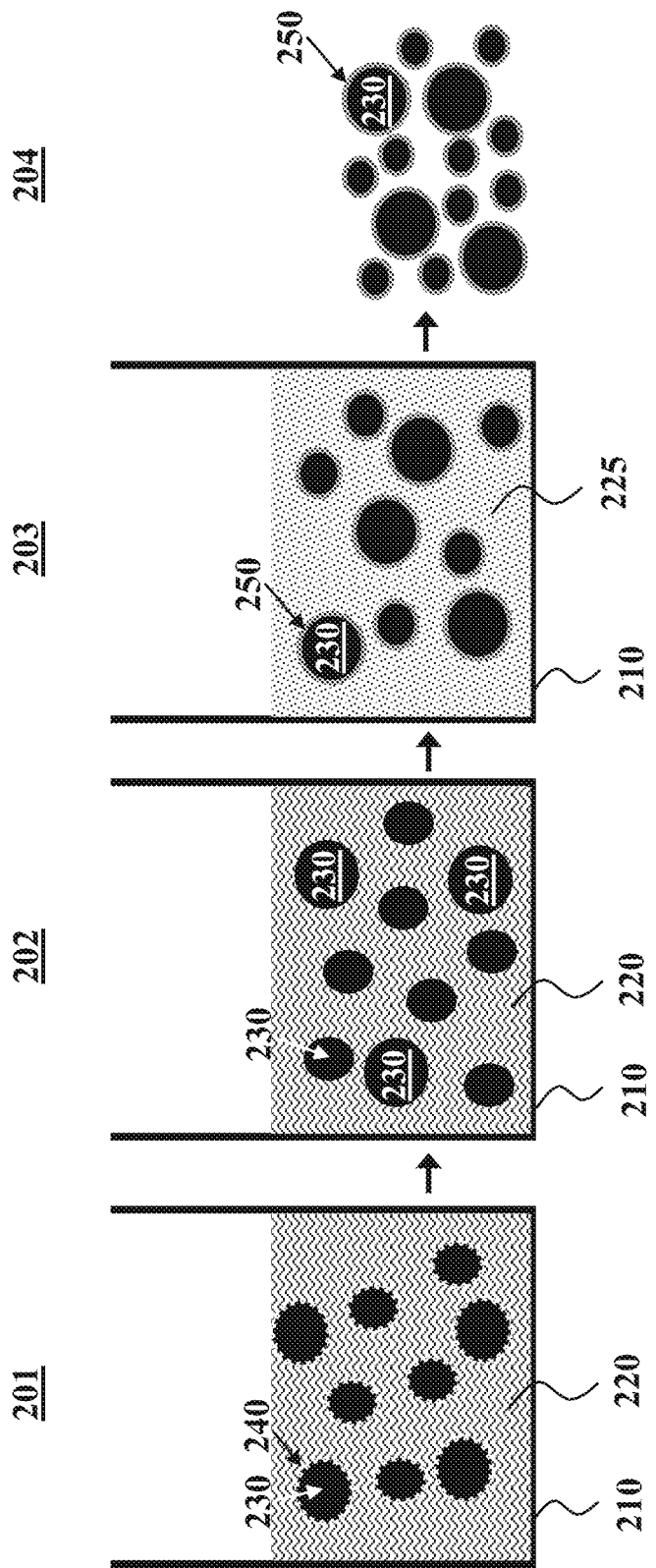
FIG. 2 illustrates a method to produce an immersion deposition of reactive metal powders, according to some embodiments.

A graphical representation of a potential path to generate immersion deposition of reactive metal powders is shown in FIG. 2. In this sketch, sequential method steps 201, 202, 203, and 204 are illustrated, as follows. In step 201, a reactive metal powder 230 having an oxide layer 240 (depicted as a dotted line surrounding each particle 230) is added to a container 210 and combined with an ionic liquid 220. The reactive metal powder 230 may be added to an ionic liquid 220, or the reactive metal powder 230 may be added first and then the ionic liquid 220 may be introduced. Alternatively, or additionally, the reactive metal powder 230 and the ionic liquid 220 may be mixed and then introduced to the container 210. The container 210 may be open or closed, and may be agitated or non-agitated.

In step 202, the oxide layer 240 is etched in the ionic liquid 220, resulting in powder particles 230 without an outer oxide layer. During etching, the oxide enters solution 220. It is noted that step 202 is not necessary if the starting particles 230 do not contain an oxide layer 240, or if the amount of oxide present is not problematic.

In step 203, a noble metal salt is added to the ionic liquid, resulting in a solution 225 of noble metal salt dissolved in ionic liquid, in container 210. Immersion deposition of reactive metal powder occurs in step 203, resulting in a particle 230 coated with an immersion deposit 250 containing a noble metal (derived from the noble metal salt in solution 225), referred to here as coated particles 230/250.

Finally, in step 204, the solution 225 is removed from the coated particles 230/250, such as by filtering and drying, resulting in coated particles 230/250 which are a plurality of particles containing a reactive metal coated with a coating comprising one or more noble metals, wherein at least one of the noble metals has a higher (i.e., less negative) standard reduction potential than the reactive metal.

In preferred methods, the main electrolyte is an ionic liquid, and no electrical current is needed or used. In preferred methods, no electrical or electrochemical activation of the powders is required due to the nature of the ionic liquid.

The immersion deposit obtained by the method depicted in FIG. 2, or other embodiments, may be characterized by a thickness from about 1 nanometer to about 100 microns, for example. In various embodiments, the immersion deposit thickness may be about 5 nm, 10 nm, 25 nm, 50 nm, 75 nm, 100 nm, 250 nm, 500 nm, 750 nm, 1 μm, 5 μm, 10 μm, 25 μm, 50 μm, or 75 μm. When multiple layers of immersion deposits are made (by sequentially more noble metals being deposited), the overall thickness may be from about 2 nanometers to about 1 millimeter or greater.

A coated reactive metal powder may be utilized in standard powder metallurgy processes to create a solid structure. It is an advantage to use powders with potential active metals at the surface of particles. As discussed previously, minor surface chemistry changes can have significant impacts on the ability to sinter materials. In the case of aluminum, this is incredibly important due to the robust oxide layer. Immersion layers with metals such as copper can completely displace the oxide barrier and form favorable eutectics, which can improve sintering. In addition to preventing oxidation prior to processing, the thin layer is easily diffused into the powder, providing a strengthening alloying element. Careful selection of coating material(s) can drastically improve sintering while adding a solid solution of precipitation strengthening of the final product.

Some possible powder metallurgy processing techniques that may be used include but are not limited to hot pressing, low-pressure sintering, extrusion, metal injection molding, and additive manufacturing. In the case of additive manufacturing, the ability to alter the emissivity of the individual powders may control energy input from an applied energy source.

Generally, the material may be present in an article or object. Some variations of the invention provide an article containing from about 0.25 wt % to 100 wt % of a coated reactive metal with a coating comprising one or more noble metals, wherein at least one of the noble metals has a higher standard reduction potential than the reactive metal, and wherein the coating has a thickness from about 1 nanometer to about 100 microns.

In some embodiments, the article contains about 95 wt % or more of the coated reactive metal. In other embodiments, the article contains about 0.25 wt % to about 95 wt % or more of the coated reactive metal. The solid article may contain at least about 1 wt %, 5 wt %, 10 wt %, 20 wt %, 30 wt %, 40 wt %, 50 wt %, 60 wt %, 70 wt %, 80 wt %, 90 wt %, 95 wt %, or more, of the material.

The article may contain multiple reactive metals, each coated with one or more noble metals. The coating in the article may contain multiple layers each containing one or more noble metals.

The article may have a porosity from 0% to about 75%, such as about 5%, 10%, 20%, 30%, 40%, 50%, 60%, or 70%, in various embodiments. The porosity may derive from space both within particles (e.g., hollow shapes) as well as space outside and between particles. The total porosity accounts for both sources of porosity.

The article may be selected from the group consisting of a sintered structure, a coating, a weld filler, a billet, a net-shape part, a near-net-shape part, and combinations thereof. The article may be produced from the coated reactive metal by a process comprising one or more techniques selected from the group consisting of hot pressing, cold pressing, sintering, extrusion, injection molding, additive manufacturing, electron-beam melting, selective laser sintering, pressureless sintering, and combinations thereof.

In some embodiments of the invention, the coated particles are fused together to form a continuous or semi-continuous material. As intended in this specification, "fused" should be interpreted broadly to mean any manner in which particles are bonded, joined, coalesced, or otherwise combined, at least in part, together. Many known techniques may be employed for fusing together particles.

In various embodiments, fusing is accomplished by sintering, heat treatment, pressure treatment, combined heat/pressure treatment, electrical treatment, electromagnetic treatment, melting/solidifying, contact (cold) welding, solution combustion synthesis, self-propagating high-temperature synthesis, solid state metathesis, or a combination thereof.

"Sintering" should be broadly construed to mean a method of forming a solid mass of material by heat and/or pressure without melting the entire mass to the point of liquefaction. The atoms in the materials diffuse across the boundaries of the particles, fusing the particles together and creating one solid piece. The sintering temperature is typically less than the melting point of the material. In some embodiments, liquid-state sintering is used, in which at least one but not all elements are in a liquid state.

When sintering or another heat treatment is utilized, the heat or energy may be provided by electrical current, electromagnetic energy, chemical reactions (including formation of ionic or covalent bonds), electrochemical reactions, pressure, or combinations thereof. Heat may be provided for initiating chemical reactions (e.g., to overcome activation energy), for enhancing reaction kinetics, for shifting reaction equilibrium states, or for adjusting reaction network distribution states.

Some possible powder metallurgy processing techniques that may be used include, but are not limited to, hot pressing, sintering, high-pressure low-temperature sintering, extrusion, metal injection molding, and additive manufacturing.

A sintering technique may be selected from the group consisting of radiant heating, induction, spark plasma sintering, microwave heating, capacitor discharge sintering, and combinations thereof. Sintering may be conducted in the presence of a gas, such as air or an inert gas (e.g., Ar, He, or $CO_2$), or in a reducing atmosphere (e.g., $H_2$ or CO).

Various sintering temperatures or ranges of temperatures may be employed. A sintering temperature may be about, or less than about, 100° C., 200° C., 300° C., 400° C., 500° C., 600° C., 700° C., 800° C., 900° C., or 1000° C.

A sintering temperature is preferably less than the reactive-metal melting temperature. In some embodiments, a sintering temperature may be less than a maximum alloy melting temperature, and further may be less than a minimum alloy melting temperature. In certain embodiments, the sintering temperature may be within the range of melting points for a selected alloy. In some embodiments, a sintering temperature may be less than a eutectic melting temperature of the particle alloy.

At a peritectic decomposition temperature, rather than melting, a metal alloy decomposes into another solid compound and a liquid. In some embodiments, a sintering temperature may be less than a peritectic decomposition temperature of the metal alloy. If there are multiple eutectic melting or peritectic decomposition temperatures, a sintering temperature may be less than all of these critical temperatures, in some embodiments.

In some embodiments pertaining to aluminum alloys employed in the microparticles, the sintering temperature is preferably selected to be less than about 450° C., 460° C., 470° C., 480° C., 490° C., or 500° C. The decomposition temperature of eutectic aluminum alloys is typically in the range of 400–600° C. (Belov et al., *Multicomponent Phase Diagrams: Applications for Commercial Aluminum Alloys*, Elsevier, 2005), which is hereby incorporated by reference herein.

The solid article may be produced by a process selected from the group consisting of hot pressing, cold pressing and sintering, extrusion, injection molding, additive manufacturing, electron beam melting, selected laser sintering, pressureless sintering, and combinations thereof. The solid article may be, for example, a coating, a coating precursor, a substrate, a billet, a net shape part, a near net shape part, or another object.

An additional benefit for additive manufacturing is related to the reflectivity of the particles. Aluminum microparticles are highly reflective, which makes it difficult to locally melt using incident laser energy. Particles provided herein may have different optical properties which could be used to alter the surface absorptivity of the incident laser energy. This could be tailored to control energy absorptivity of a particle bed, thereby improving consistency in the system. These factors have the potential to lower the operating costs of additive manufacturing and widening the parameter window to develop new processing techniques and materials.

This invention enables the sintering of high-strength aluminum parts. This enables net and near-net shape part production of high-strength aluminum components, especially with emerging additive manufacturing techniques such as electron beam melting or selective laser sintering. Other commercial applications also exist, including sintering aids in other base alloy powder metallurgy; foaming agent to produce metal foams; high surface area hydrogen storage materials; and battery or fuel cell electrodes.

The article may include a plurality of hollow particle shapes selected from the group consisting of spheres, cubes, rods, octets, irregular shapes, random shapes, and combinations thereof. The hollow shapes typically encompass a small closed volume. A thin shell may contain a small amount of gas (e.g., air, an inert gas, or a synthetic mixture of gases) that may be at a pressure below one atmosphere. Since air and other gases are excellent thermal insulators and have very low heat capacity compared to any solid material, hollow shapes can provide low thermal conductivity and low heat capacity. The hollow shapes may also contain empty space, i.e. vacuum or near vacuum.

It is noted that "sphere" means substantially round geometrical objects in three-dimensional space that resemble the shape of a round ball. Not every sphere is perfectly round, some spheres may be fragmented, and other shapes may be present within the spheres. For example, imperfect spheres may arise due to pressure applied during sintering, leading to ovoids (egg shapes) or other irregular shapes or random shapes.

The spheres (or other particle shapes), in some embodiments, are not hollow or only partially hollow, i.e. porous. The spheres (or other particle shapes) may be bonded together with an adhesive and/or embedded in a matrix material. In certain embodiments, the spheres (or other particle shapes) are sintered together without an adhesive or matrix material. It is possible to combine these techniques so that a portion of particles are bonded together with an adhesive or matrix material while another portion of particles are sintered together without an adhesive or matrix material.

Particle attraction may be affected by the addition of salts, organic molecules, or acids and bases. The organic ligands may contain amine, carboxylic acid, thiol, or cyano functional groups, for example. These ligands may be added at any time during the process or to an individual component prior to final assembly. For instance, the particles may be mixed in a solvent with organic ligands to coat the particle surface with active charge sites.

Variations of the invention may be employed to coat a bulk substrate or part, where the bulk substrate or part contains an exposed reactive metal. The exposed reactive metal may be coated with an ionic liquid and a noble metal salt, optionally with removal of an oxide layer, under conditions effective to form an immersion deposit onto the exposed reactive metal.

Some embodiments thus provide a method of forming an immersion deposit on a reactive metal substrate or part, wherein the immersion deposit comprises one or more noble metals, the method comprising:

(a) obtaining or providing a reactive metal substrate or part, an ionic liquid, and one or more noble metal salts, wherein the one or more noble metal salts are in the form of a solid, a liquid, or a gas;

(b) combining the reactive metal substrate or part, the ionic liquid, and the one or more noble metal salts to form a reaction mixture, wherein at least one of the noble metals has a higher standard reduction potential than the reactive metal;

(c) selecting effective reaction conditions to deposit at least one of the noble metals on the reactive metal substrate or part by a surface-displacement reaction, thereby generating the immersion deposit on the reactive metal substrate or part; and (d) removing the ionic liquid from the immersion deposit.

The resulting structure is a metallic part, region, or substrate comprising a reactive metal coated with a coating comprising one or more noble metals, wherein at least one of the noble metals has a higher standard reduction potential than the reactive metal. The coating may have a thickness from about 1 nanometer to about 100 microns. In other embodiments, the coating may have a larger thickness, such as about 100 microns, about 1 millimeter, about 1 centimeter, or more.

EXAMPLES

Example 1: Aluminum 7075 Powder with Copper Immersion Deposit

Aluminum alloy 7075 (Al7075) is an aluminum alloy, with zinc as the primary alloying element. In this example, all coating steps are completed in an argon-filled glove box with less than 5 ppm oxygen present. 0.25 g of aluminum 7075 powder (−325 mesh) is added to 50 mL of 2:1 $AlCl_3$:1-ethyl-3-methylimidazolium chloride ionic liquid at room temperature and stirred with a magnetic stir bar. 0.25 g of $CuCl_2$ is added to the mixture and stirred with the powder, resulting in an orange-colored liquid. The mixture is stirred for approximately 3 hours until the solution appears clear. The particles, now dark, are allowed to settle to the bottom and the ionic liquid is filtered through a 2-micron glass fiber filter paper. The particles are removed and placed in a vial. 20 mL of anhydrous toluene is then added to the powder (particles) and mixed. The particles are allowed to settle, and the toluene with some residual ionic liquid is decanted. These washing steps are completed three times. The particles are then allowed to dry in the glove box, before removal and inspection.

Example 2: Aluminum 7075 Powder with Copper Immersion Deposit

In this example, all coating steps are completed in an argon-filled glove box with less than 3 ppm oxygen and moisture present. 0.25 g of aluminum 7075 powder (−325 mesh) is added to 50 mL of a 50:50 volume ratio of 2:1 $AlCl_3$:1-ethyl-3-methylimidazolium chloride ionic liquid and 1,2-dichlorobenzene (DCB) at room temperature and stirred with a magnetic stir bar. 0.25 g of CuCl is added to the mixture and stirred with the powder, resulting in an orange liquid. The mixture is stirred for three hours and then allowed to settle overnight. The ionic liquid is decanted off the top. 50 mL of fresh DCB is added to the particles and stirred for 5 min. The particles are allowed to settle and the DCB is decanted. These washing steps are repeated a total of three times to wash the ionic liquid off the particles. The particles are then dried under vacuum and removed from the glove box for analysis.

Figure 3:
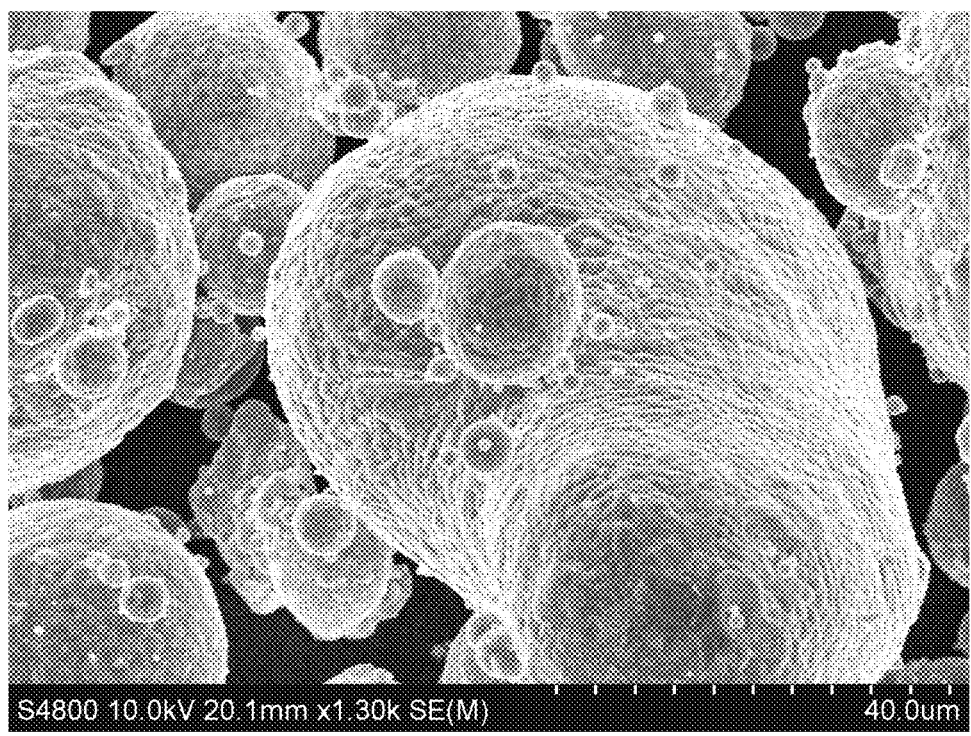
FIG. 3 shows an SEM image of a starting aluminum 7075 powder in Example 2.
Figure 4:
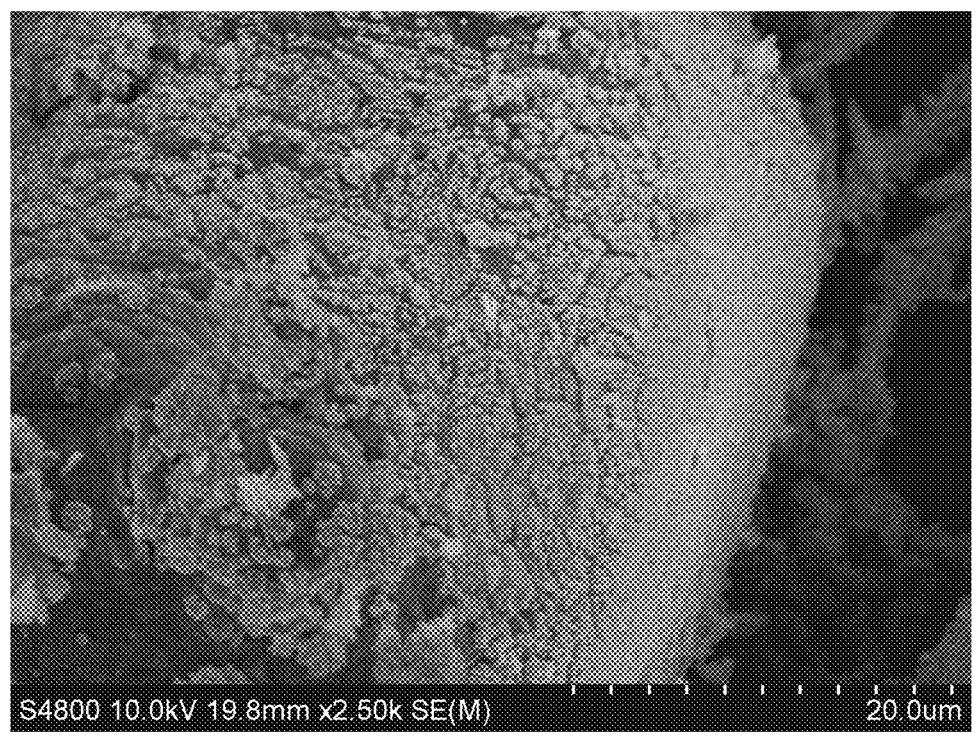
FIG. 4 shows an SEM image of an aluminum 7075 powder with copper immersion deposit, in Example 2.
Figure 5:
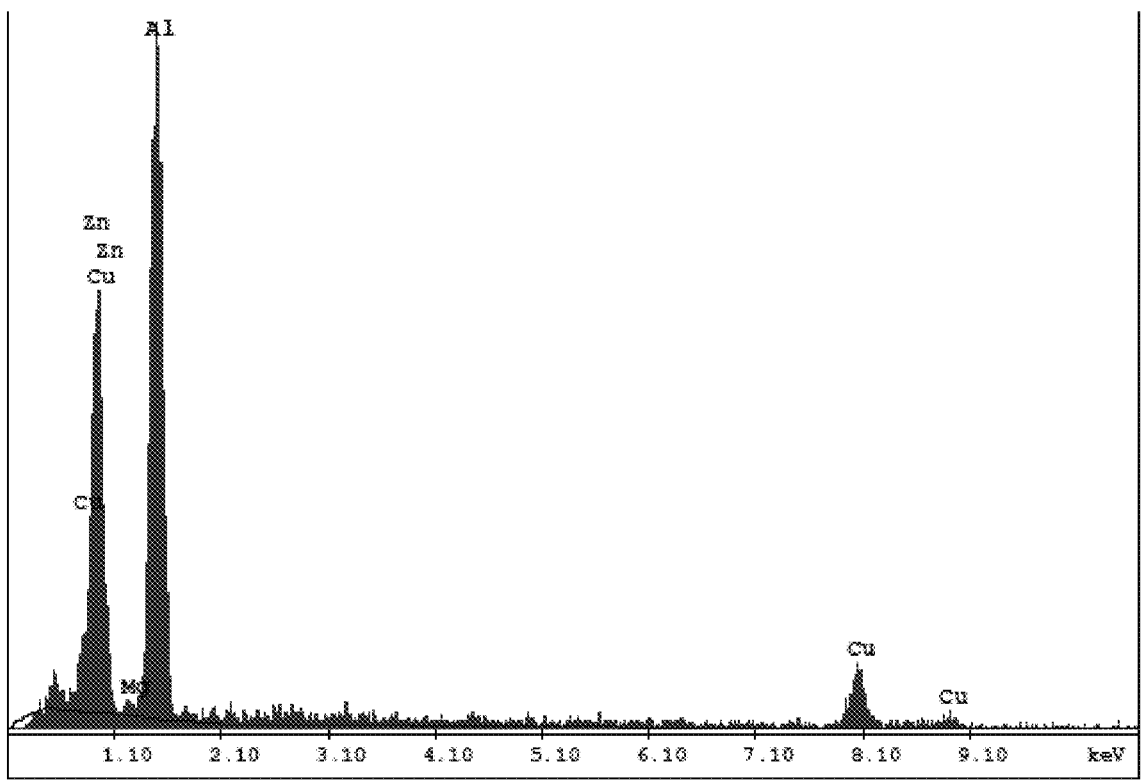
FIG. 5 presents an EDS spectrum of the copper-coated aluminum 7075 powder Example 2.

Scanning electron microscope (SEM) images are taken before (FIG. 3) and after (FIG. 4). FIG. 3 is an SEM image of the starting aluminum 7075 powder, while FIG. 4 is an SEM image of aluminum 7075 powder with copper immersion deposit. EDS is used to confirm that the coating on the particles is copper and that essentially all residual ionic liquid is removed. FIG. 5 shows an EDS spectrum of the copper-coated aluminum 7075 powder of FIG. 4. The EDS spectrum shows significantly more copper than would be expected in aluminum 7075 (~1.5 at %), indicating the coating is mostly copper. The lack of detectable chlorine indicates that the ionic liquid has been successfully removed from the particles.

Comparative Example: Sintering of Uncoated Aluminum 7075 Powder

Uncoated aluminum 7075 powder is placed as a loose powder in a graphite differential scanning calorimetry (DSC) pan and sintered at 700° C. for 2 hours under flowing ultra-high-purity argon. (Note: Liquidus temperature for Al7075 is 635° C.).

Figure 6:
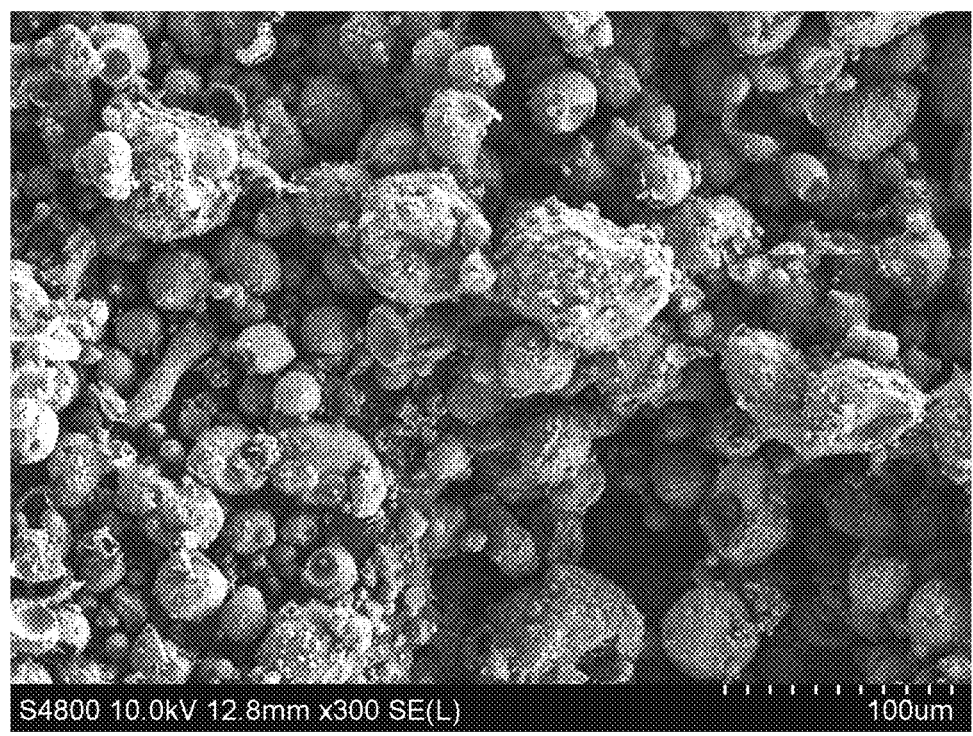
FIG. 6 shows an SEM image of an Al7075 powder after 700° C. for 2 hours, in the Comparative Example.

After cooling, the material is analyzed using the SEM. FIG. 6 shows an SEM image of the Al7075 powder after 700° C. for 2 hours.

The resulting material is still a free-flowing powder with only sporadic necking between particles. Despite heating the material for an extended period of time well above the melting point, sintering is still inhibited by the oxide barrier, in this Comparative Example.

Example 3: Sintering of Aluminum 7075 Powder with Copper Immersion Deposit

The material from Example 2 is placed as a loose powder into an aluminum DSC pan and sintered at 480° C. for 2 hours under flowing ultra-high-purity argon. The DSC curve indicates that the reaction at 480° C. is endothermic and indicative of some surface melting which aids in sintering. 480° C. is chosen as the target sintering temperature of the material because it is the solid-solution temperature of aluminum 7075. The solid-solution temperature is the temperature used to bring everything into solution.

Figure 7:
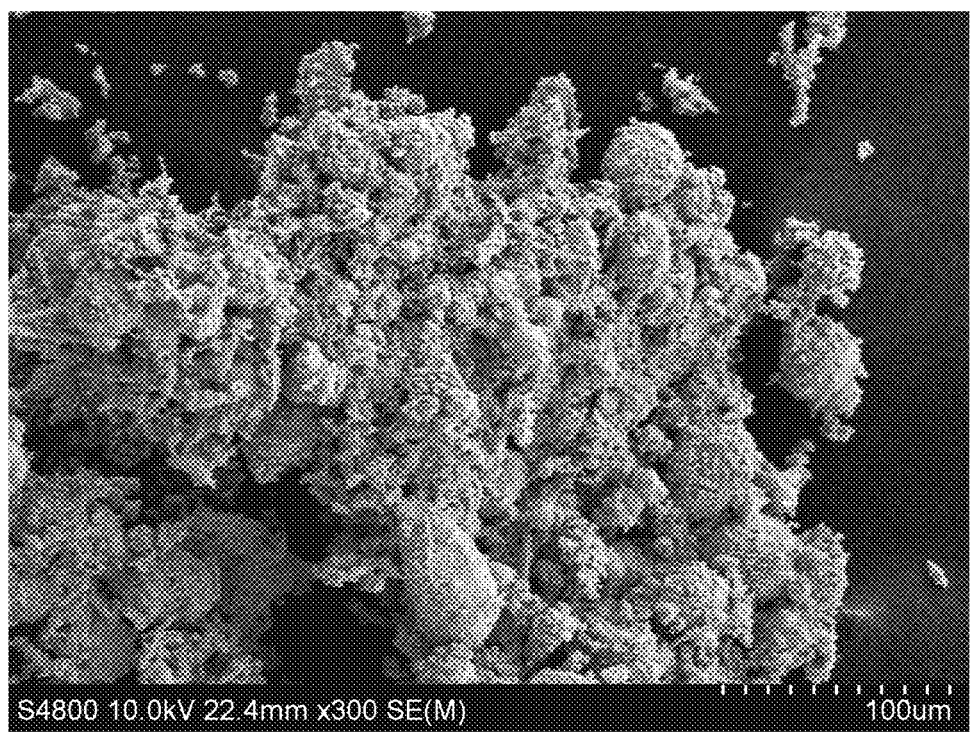
FIG. 7 shows an SEM image of an Al7075 with copper immersion deposition, sintered at 480° C. for 2 hours, in Example 3.

After cooling, the material is analyzed using the SEM. FIG. 7 shows an SEM image of Al7075 with copper immersion deposition, sintered at 480° C. for 2 hours.

With the addition of the immersion copper coating, the resulting material is able to sinter surprisingly well at 480° C., which is much lower than the failed 700° C. treatment of plain Al powder in the Comparative Example.

In this detailed description, reference has been made to multiple embodiments and to the accompanying drawings in which are shown by way of illustration specific exemplary embodiments of the invention. These embodiments are described in sufficient detail to enable those skilled in the art to practice the invention, and it is to be understood that modifications to the various disclosed embodiments may be made by a skilled artisan.

Where methods and steps described above indicate certain events occurring in certain order, those of ordinary skill in the art will recognize that the ordering of certain steps may be modified and that such modifications are in accordance with the variations of the invention. Additionally, certain steps may be performed concurrently in a parallel process when possible, as well as performed sequentially.

All publications, patents, and patent applications cited in this specification are herein incorporated by reference in their entirety as if each publication, patent, or patent application were specifically and individually put forth herein.

The embodiments, variations, and figures described above should provide an indication of the utility and versatility of the present invention. Other embodiments that do not provide all of the features and advantages set forth herein may also be utilized, without departing from the spirit and scope of the present invention. Such modifications and variations are considered to be within the scope of the invention defined by the claims.

What is claimed is:

1. A method of forming an immersion deposit on a reactive metal, wherein said immersion deposit comprises one or more noble metals, said method comprising:
   (a) obtaining a reactive metal, an ionic liquid, and one or more noble metal salts containing one or more noble metals, wherein said one or more noble metal salts are in a form of a solid, a liquid, or a gas;
   (b) combining said reactive metal, said ionic liquid, and said one or more noble metal salts to form a reaction mixture, wherein at least one of said one or more noble metals has a higher standard reduction potential than said reactive metal;
   (c) selecting effective reaction conditions to deposit said at least one of said one or more noble metals on said reactive metal by a surface-displacement reaction without hydrogen evolution, thereby generating said immersion deposit on said reactive metal; and
   (d) removing said ionic liquid from said immersion deposit,
   wherein at least one of said one or more noble metals is surface-reacted with hydrogen during step (c) to form a noble-metal hydride contained in said immersion deposit.

2. The method of claim 1, wherein said immersion deposit has a thickness from 1 nanometer to 100 microns.

3. The method of claim 2, wherein said immersion deposit has a thickness from 1 nanometer to 1 micron.

4. The method of claim 1, wherein said immersion deposit has a thickness of a single atomic layer.

5. The method of claim 1, wherein said immersion deposit on said reactive metal is in a form of a plurality of powder particles that are from 10 nanometers to 1 centimeter in average diameter.

6. The method of claim 1, wherein said immersion deposit includes from 1 to 10 coating layers, and wherein each of said coating layers has a thickness from 1 nanometer to 20 microns.

7. The method of claim 6, wherein said immersion deposit includes multiple coating layers containing noble metals that have increasing standard reduction potentials in a direction away from said reactive metal.

8. The method of claim 1, wherein said reactive metal is selected from the group consisting of alkali metals, alkaline earth metals, aluminum, silicon, titanium, zirconium, hafnium, zinc, and combinations or alloys thereof.

9. The method of claim 8, wherein said reactive metal is selected from aluminum, magnesium, or an alloy containing greater than 50 at % of aluminum and/or magnesium.

10. The method of claim 1, wherein said one or more noble metals are selected from the group consisting of aluminum, zirconium, titanium, zinc, nickel, cobalt, copper, silver, gold, palladium, platinum, rhodium, molybdenum, uranium, niobium, tungsten, tin, lead, tantalum, chromium, iron, indium, rhenium, ruthenium, osmium, iridium, and combinations or alloys thereof.

11. The method of claim 1, wherein said reactive metal has a standard reduction potential less than the standard reduction potential of a standard hydrogen electrode.

12. The method of claim 1, wherein said immersion deposit further contains a salt, carbon, an organic additive, an inorganic additive, or a combination thereof.

13. The method of claim 1, wherein said ionic liquid is selected from the group consisting of aluminum chloride, 1-ethyl-3-methylimidazolium chloride, N-alkylpyridinium halides, N-alkylimidazolium halides, N,N'-alkylimidazolium halides, N-alkylpyrazolium halides, N,N'-alkylpyrazolium halides, and combinations thereof.

14. The method of claim 1, wherein said ionic liquid includes an anion selected from the group consisting of halides, bis(trifluoromethylsulfonyl) amide, tris(pentafluoroethyl)trifluorophosphate, trifluoroacetate, trifluoromethylsulfonate, dicyanoamide, tricyanomethide, tetracyanoborate, tetraphenylborate, tris(trifluoromethylsulfonyl) methide, thiocyanate, and combinations thereof.

15. The method of claim 1, wherein said one or more noble metal salts are dissolved in a solvent prior to step (b).

16. The method of claim 1, wherein step (d) utilizes a technique selected from the group consisting of filtering, decanting, washing, diluting, centrifuging, drying, and combinations thereof.

17. The method of claim 1, wherein an oxide-removing ionic liquid is introduced to remove residual oxides from said reactive metal, and wherein said oxide-removing ionic liquid is different than said ionic liquid obtained in step (a).

18. The method of claim 17, wherein said oxide-removing ionic liquid is removed by a technique selected from the group consisting of filtering, decanting, washing, diluting, centrifuging, drying, and combinations thereof.

19. The method of claim 1, wherein said method does not employ an external electric field.

* * * * *